United States Patent
Gelman et al.

(10) Patent No.: US 12,457,437 B2
(45) Date of Patent: *Oct. 28, 2025

(54) OPTICAL COMMUNICATION NETWORK CONFIGURATION

(71) Applicant: ECI Telecom Ltd., Petah Tikva (IL)

(72) Inventors: Efraim Gelman, Ramat Gan (IL); Inbal Hecht, Petah Tikva (IL); Shirel Ezra, Ganei Tal (IL)

(73) Assignee: ECI Telecom Ltd., Petah Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/677,283

(22) Filed: May 29, 2024

(65) Prior Publication Data
US 2024/0397244 A1 Nov. 28, 2024

Related U.S. Application Data

(63) Continuation of application No. 18/329,370, filed on Jun. 5, 2023, now Pat. No. 12,219,305.
(Continued)

(51) Int. Cl.
*H04Q 11/00* (2006.01)
*H04W 40/04* (2009.01)

(52) U.S. Cl.
CPC ........ *H04Q 11/0066* (2013.01); *H04W 40/04* (2013.01); *H04Q 2011/0081* (2013.01); *H04Q 2011/0083* (2013.01)

(58) Field of Classification Search
CPC ....... H04Q 11/0066; H04Q 2011/0081; H04Q 2011/0083; H04W 40/04; G04Q 11/0066
(Continued)

(56) References Cited

U.S. PATENT DOCUMENTS

| 10,498,590 | B1 | 12/2019 | Ezra et al. |
| 10,841,003 | B1 | 11/2020 | Ezra et al. |

(Continued)

FOREIGN PATENT DOCUMENTS

EP  2837121 B1  12/2019

OTHER PUBLICATIONS

Extended European Search Report in counterpart European Patent Application No. 23184569.4 mailed May 10, 2024, 11 pages.

*Primary Examiner* — Syed Haider
(74) *Attorney, Agent, or Firm* — Finnegan, Henderson, Farabow, Garrett & Dunner LLP

(57) ABSTRACT

A network management system can be configured to identify routes for satisfying a set of demands on a communications network using layer graph(s). The network management system can generate the layer graph(s) using a network graph that represents the optical communication network and an associated sets of available frequency slots. The network management system can iteratively identify candidate path(s) on the layer graph(s) that correspond to each of the demands and determine a cost for each candidate path. The cost for a candidate path can depend on a set of available edges affected by the selection of the candidate path. In each iteration, the network management system can select the lowest cost candidate path, update the network graph to reflect the selection of this candidate path, update the layer graph(s) based on the updating of the network graph, and update the candidate paths for the remaining demands as needed.

20 Claims, 9 Drawing Sheets

Related U.S. Application Data

(60) Provisional application No. 63/436,777, filed on Jan. 3, 2023.

(58) Field of Classification Search
USPC .......................................................... 398/45
See application file for complete search history.

(56) References Cited

U.S. PATENT DOCUMENTS

| | | | |
|---|---|---|---|
| 2005/0069314 A1 | 3/2005 | De Patre et al. | |
| 2006/0257146 A1* | 11/2006 | Nuzman | H04Q 11/0062 |
| | | | 398/63 |
| 2012/0251117 A1 | 10/2012 | Patel et al. | |
| 2013/0216225 A1 | 8/2013 | Patel et al. | |
| 2015/0341135 A1* | 11/2015 | Xia | H04J 14/0212 |
| | | | 398/83 |
| 2019/0215055 A1* | 7/2019 | Majmundar | H04W 40/22 |
| 2020/0195730 A1 | 6/2020 | Ezra | |

\* cited by examiner

OPTICAL COMMUNICATION NETWORK CONFIGURATION

CROSS-REFERENCE TO RELATED APPLICATIONS

This application is a continuation of U.S. patent application Ser. No. 18/329,370, filed Jun. 5, 2023, which claims the benefit of U.S. Provisional Application No. 63/436,777, filed Jan. 3, 2023. These applications are incorporated herein by reference in their entireties.

TECHNICAL FIELD

The present disclosure relates to the field of communication networks and, more particularly, to systems and methods for routing in communication networks.

BACKGROUND

An optical communication network can be configured to satisfy demands. Such demands can include requests to communicate (or establish a communication channel, or the like) between a source node and a target node in the network. The communication network can satisfy the demands using one or more routes provided through the communication network. Each route can be implemented using hardware (e.g., transceivers, or the like) or software resources (e.g., compute, memory, or the like) of the communication network. Determining routes on a communications network that satisfy a set of demands is an NP-hard problem. Because this problem is NP-hard, determining an optimal assignment of paths, for some optimality criterion, becomes intractable as the size of the optical communication network or number of demands increases.

SUMMARY

Systems and methods are disclosed for configuring an optical communication network to satisfy a set of demands. A network management system can identify routes for the demands using graph layer(s) generated from a network graph representing the optical communication network and sets of available frequency slots.

The disclosed embodiments include a method for configuring an optical communication network. The method can include obtaining a network graph representing the optical communication network. The network graph can include network graph edges corresponding to communications links in the optical communication network and network graph vertices corresponding to nodes of the optical communication network. Each of the network graph edges can be associated with an available subset of a set of frequency slots for the optical communication network. The method can include obtaining a demand on the optical communication network, the demand having a corresponding source network graph vertex and terminal network graph vertex on the network graph. The method can include constructing layer graphs using the network graph. Each of the layer graphs can correspond to one of the frequency slots. Each of the layer graphs can include layer edges and layer vertices. The layer edges can correspond to the network graph edges that include, in the available subsets for the network graph edges, the one of the frequency slots. The layer vertices can correspond to the network graph vertices connected by the network graph edges that include, in the available subsets for the network graph edges, the one of the frequency slots. The layer vertices can include a source layer vertex corresponding to the source network graph vertex and a terminal layer vertex corresponding to the terminal network graph vertex. The method can include selecting a path over a first layer of the layer graphs that connects the source layer vertex of the first layer to the terminal layer vertex of the first layer. The selection can be based on a cost associated with the selected path. The method can include configuring the optical communication network to satisfy the demand using the selected path over the first layer.

The disclosed embodiments can include an additional method for configuring an optical communication network. The method can include obtaining layer graphs. Each of the layer graphs can correspond to one of a set of frequency slots on the optical communication network. Each of the layer graphs can include layer vertices corresponding to a subset of a set of network vertices. The network vertices can correspond to nodes of the optical communication network. The layer vertices can include a source layer vertex and a terminal layer vertex. The source layer vertex can correspond to a source node of a demand on the optical communication network and the terminal layer vertex corresponding to a terminal node of the demand on the optical communication network. The layer edges can correspond to a subset of network edges. The network edges can correspond to communication links in the optical communication network. Each layer edge can connect two of the layer vertices. Layer edge costs can be associated with the layer edges. A first layer edge cost for a first layer edge can be based on the layer graphs or layer graph edges affected by the first layer edge. The method can include determining a path from the source layer vertex to the terminal layer vertex based on the layer edge costs. The method can include configuring, based on the determined cost, the optical communication network to use the path to satisfy the demand.

The disclosed embodiments include a further method for configuring an optical communication network. The method can include obtaining a network graph representing the optical communication network. The network graph can include network graph edges corresponding to communications links in the optical communication network. The network graph can include network graph vertices corresponding to nodes of the optical communication network. A demand on the optical communication network can have a corresponding source network graph vertex and terminal network graph vertex on the network graph. The demand can be associated with a frequency slot width of two. The network graph can include k subnetworks. Each subnetwork can include two of the graph vertices. The two of the graph vertices can be connected by three of the network graph edges. For each $2 \leq j < k$, one of the two of the graph vertices of subnetwork j can be connected to subnetwork j−1 through an intermediate subnetwork j−1 and the other of the two of the graph vertices of subnetwork j can be connected to subnetwork j+1 through an intermediate subnetwork j. The one of the two of the graph vertices of subnetwork 1 not connected through intermediate subnetwork 1 to subnetwork 2 can be the source network graph vertex. The one of the two of the graph vertices of subnetwork k not connected through intermediate subnetwork k−1 to subnetwork k−1 can be the terminal network graph vertex. A set of frequency bands $\{c_1, c_2, \ldots, c_n\}$ can be associated with the optical communication network. A set of overlapping frequency slots can include consecutive pairs of these frequency bands. One of the three of the network graph edges $e_j$ in each subnetwork j can have an available subset of the overlapping frequency slots that excludes the frequency slots $\{\{c_4, c_5\}, \{c_5, c_6\},$ $\{c_6, c_7\}, \{c_8, c_9\}, \{c_9, c_{10}\}, \{c_{10}, c_{11}\}\}$. For each of the remaining network graph edges, an available subset of the overlapping frequency slots can include the entire set of overlapping frequency slots. The method can include determining a frequency slot and a path through the network graph. The frequency slot can be $\{c_7, c_8\}$ and the path can include edges $e_1$ to $e_k$.

The disclosed embodiments further include systems configured to perform the disclosed methods, and non-transitory, computer-readable media containing instructions for performing the disclosed methods.

The foregoing general description and the following detailed description are exemplary and explanatory only and are not restrictive of the claims.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Figure 1:
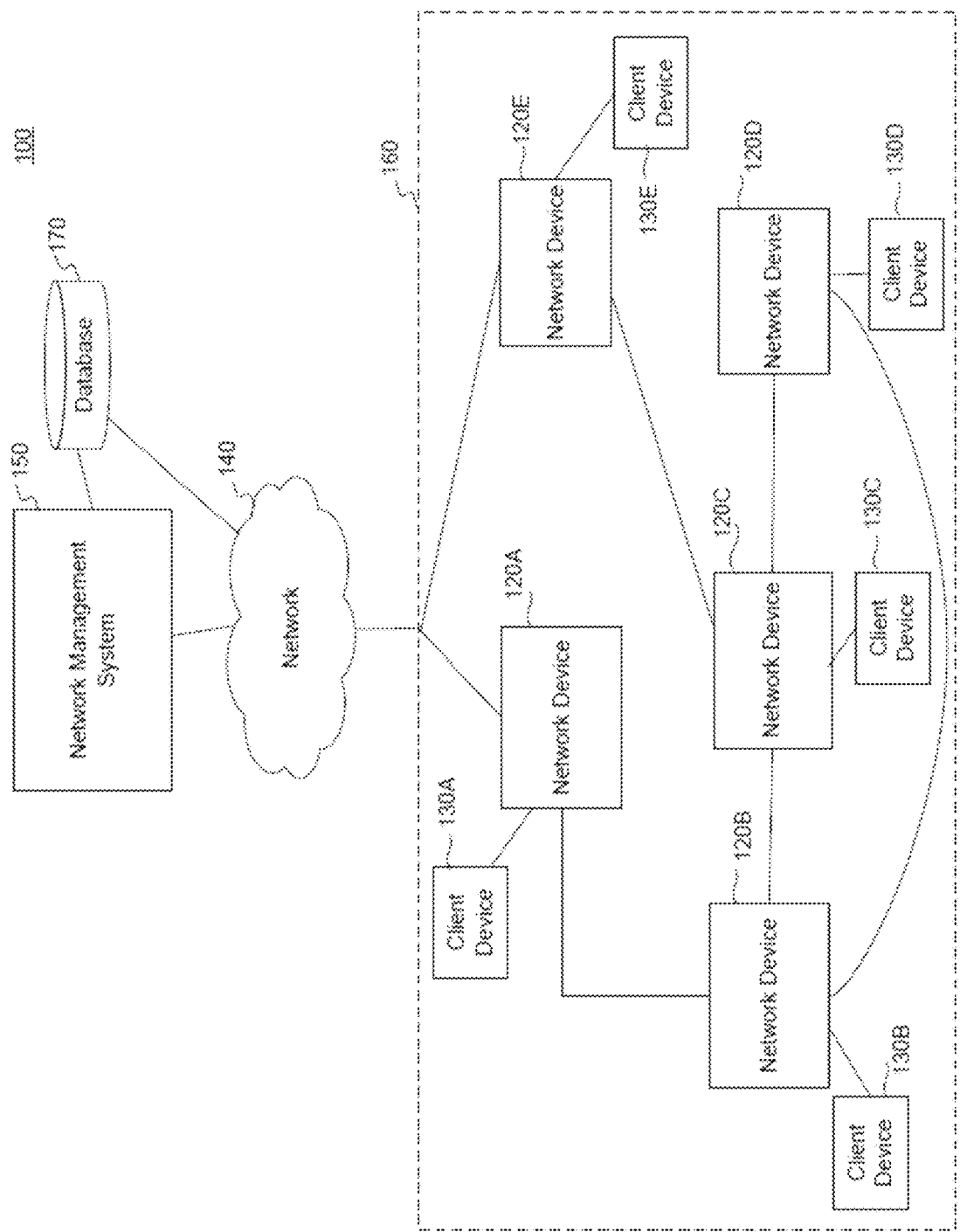
FIG. 1 depicts an exemplary data communication network in which various implementations as described herein may be practiced.

The following detailed description refers to the accompanying drawings. Wherever possible, the same reference numbers are used in the drawings and the following description to refer to the same or similar parts. While several illustrative embodiments are described herein, modifications, adaptations, and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

A communication network can include network nodes (e.g., clients, servers, microservices, virtual machines, serverless code instances, IoT devices, etc.) configured to communicate with one another using communication links. The disclosed embodiments are not limited to any particular communication link implementation or physical medium. The communication links can include wired or wireless communication links. Wired communication links can include, for instance, optical links, electrical communication links, or other suitable links. Wireless communication links can include, for example, microwave, radio wave, optical links, or other suitable wireless links. Communications between network nodes can be implemented using communications protocols. The disclosed embodiments are not limited to any particular communication protocol. Communication protocols can include cellular communication protocols (e.g., 3G, 4G, 5G, or the like), IEEE 802 or IEEE 802-based protocols (e.g., Ethernet, WiFi, Zigbee or the like), digital subscriber line (DSL), plain old telephone service (POTS), or other suitable protocols.

A communication network can be configured to satisfy demands. As used herein, a demand can be a request to communicate (or establish a communication channel, or the like) between a source node and a target node in the network. In some embodiments, a demand can specify a source node and a target node. In various embodiments, one or more of the source node and target node can be implicit or determined by the communication network in response to the demand.

The communication network can satisfy the demands using one or more routes provided through the communication network. Each route can be implemented using hardware (e.g., transceivers, or the like) or software resources (e.g., compute, memory, or the like) of the communication network. Consistent with disclosed embodiments, each route can include one or more service links (e.g., light paths between two nodes in an optical network through which light passes unmodified, or the like). The communication network can be configurable to transmit multiple signals along the same communications link. Each signal can have a center frequency and a spectral width (also referred to herein as a frequency slot width). A combination of center frequency and frequency slot width can define a frequency slot. A communication link can be configurable to transmit a signal using any one of a set of frequency slots. Multiple signals can be transmitted using different, non-overlapping frequency slots. In general, wider frequency slots can transmit more information over the same distance (e.g., increased capacity), or the same information over a greater distance. The capacity constraints arising from frequency slot width can be independent of other capacity constraints that may affect a route (e.g., line rates of a transceiver, or the like).

The disclosed embodiments can be performed using a network graph representing the communication network. The network graph can include vertices corresponding to nodes in the communication network and edges corresponding to communication links in the communication network. Consistent with disclosed embodiments, a vertex or an edge can correspond to a sub-network of the communication network. For example, an edge can correspond to three links linearly connected by two nodes. As an additional example, a vertex can correspond to three connected nodes, each of these nodes connected by a link to at least one of the other two nodes. As used herein, the term graph includes semantically equivalent structures, such as adjacency matrices, adjacency lists, adjacency sets, or other semantically equivalent structures.

Determining routes on a communications network that satisfy a set of demands is an NP-hard, technical problem. Because this problem is NP-hard, determining an optimal assignment of paths, for some optimality criterion, becomes intractable as the size of the optical communication network or number of demands increases. Multiple potential routes can exist between a source node and target node of a demand on the communication network. These routes may use different frequency slots (or diffing combinations of frequency slots) and pass through different sets of intermediate nodes on the communications network. Furthermore, potential routes for different demands can conflict. For example, assigning a demand to a frequency slot on a particular communication link can prevent other demands from using that communication link. In addition, a conflict that prevents a demand from using a frequency slot on one communication link on a route can prevent the demand from using that frequency slot on all communications links on that route, as the demand may preferentially use a single frequency slot for the entire route.

An optimal assignment of routes to demands can be approximated by iteratively selecting the lowest cost path in a set of candidate paths, according to some cost function. If necessary, the unselected candidate paths can be updated or new candidate paths determined based on the selection of the lowest cost candidate path. The selection process can continue until each demand is assigned a route or no suitable routes exist for the remaining demands. The cost function can be selected or adapted to emphasize sets of paths having certain characteristics.

The disclosed embodiments include cost functions that enable efficient assignment of routes to frequency slots. The efficiency of an assignment of routes to frequency slots can depend on the effect of that assignment on subsequent assignments. A first assignment of routes to frequency slots can be more efficient than a second such assignment when the first assignment precludes fewer subsequent assignments of routes to frequency slots. For example, as described herein, a frequency slot assignment that completely fills a "hole" between two unavailable frequency slot assignments can be more efficient than a frequency slot assignment that divides an existing set of contiguous available frequency slots into two non-contiguous subsets.

As may be appreciated, more efficient use of frequency slots can improve the capacity of the communication network. For example, the communication network can satisfy more demands, or satisfy the same number of demands using fewer resources. Accordingly, the disclosed embodiments, by improving the efficiency of assignments of routes to frequency slots, constitute a technological improvement in network communications management.

FIG. 1 depicts an exemplary communication system 100, consistent with disclosed embodiments. Communication system 100 includes, for example, a network 140, network management system 150, database 170, network devices 120A-120E (collectively nodes 120), and client devices 130A-130E (collectively client devices 130). Nodes 120 and client devices 130 form a communication network 160, in which the nodes 120 provide communication services to client devices 130. The nodes can include hardware-based or software-based switches, routers, splitters, or the like that facilitate delivery of communication services to client devices 130. The components and arrangements shown in FIG. 1 are not intended to limit the disclosed embodiments, as the system components used to implement the disclosed embodiments can vary. For example, each of nodes 120 may be associated with zero or more client devices 130. In various embodiments, communication network 160 can be implemented using on-premises network environments, virtualized (cloud) network environments, or combinations of on-premises and cloud networks. Consistent with embodiments described herein, various types of data may be communicated over communication network 160, such as Internet (e.g., IP protocol) data, telephony or telecommunications data, satellite data, IoT-based data, cellular data, proprietary network data, or other suitable data.

Network management system 150 can be a computer-based system including computer system components, desktop computers, workstations, tablets, handheld computing devices, memory devices, and/or internal network(s) connecting the components. Network management system 150 can be configured to manage communication network 160. For example, the network management system 150 may determine network routes and allocate resources for demands in the communication system 100 (e.g., by determining routing and wavelength assignment for a given set of demands).

Network 140 can facilitate communication between the network management system 150 and the communication network 160. Network management system 150 may send data to nodes 120 via network 140 to allocate resources for demands in communication network 160. Network management system 150 may also receive data from nodes 120 via network 140. This data can indicate the status of communication links in communication network 160.

Network 140 may be an electronic network. Nodes 120 may be configured to receive data over network 140 and process/analyze queries and data. Examples of network 140 include a local area network (LAN), a wireless LAN (e.g., a "WiFi" or mesh network), a Metropolitan Area Network (MAN) that connects multiple LANs, a wide area network (WAN) (e.g., the Internet), a dial-up connection (e.g., using a V.90 protocol or a V.92 protocol), a satellite-based network, a cellular-based network, etc. In the embodiments described herein, the Internet may include any publicly accessible network or networks interconnected via one or more communication protocols, including, but not limited to, hypertext transfer protocol (HTTP/s) and transmission control protocol/internet protocol (TCP/IP). Moreover, the electronic network may also include one or more mobile device networks, such as a Long-Term Evolution (LTE) network or a Personal Communication Service (PCS) network, that allow mobile devices (e.g., client devices 130) to send and receive data via applicable communication protocols, including those described above.

In the illustrated example, nodes 120A and 120E are directly connected to network 140, and nodes 120B-120D connect to the network 140 via their connection to nodes 120A and/or 120E. Nodes 120B-120D may also directly connect to network 140, or may indirectly connect to the network 140 through numerous other devices. Nodes 120 may be connected to one another via copper wire, coaxial cable, optical fiber, microwave links, or other satellite or radio communication components. Accordingly, nodes 120 may each have a corresponding communication interface (e.g., wireless transceiver, wired transceiver, adapter, etc.) to allow for such communications.

As shown in FIG. 1, nodes 120A-120E are connected to one another. In this example, node 120A is connected to node 120B, node 120B is connected to nodes 120A and 120C, node 120C is connected to node 120B, 120D, and 120E, node 120D is connected to node 120C, and node 120E is connected to node 120C. In some embodiments, the network management system 150 may obtain the connectivity status between the network devices 120 and generate a representation (e.g., a graph) of the connectivity of the network. In various embodiments, the network management system 150 can acquire the network topology from a server or a database associated with a service provider providing the communication network 160. As may be appreciated, communication network 160 illustrated in FIG. 1 is not intended to be limiting. The disclosed embodiments include other service network configurations and topologies.

Network management system 150 can be implemented using one or more computing devices (e.g., a node of node 120, a mobile device, laptop, desktop, workstation, server, computing cluster or cloud computing platform, or the like). Network management system 150 can be implemented as a distributed system over multiple computing devices. The disclosed embodiments are not limited to any particular implementation of network management system 150. In some embodiments, network management system 150 can be implemented over the nodes of communication network 160.

Database 170 can include one or more physical or virtual storages coupled with the network management system 150. Database 170 may be configured to store information associated with the communication network 160, such as a network topology, the capabilities of the nodes 120, the demands and corresponding configurations (e.g., routes or the like) provided by the communication network 160, and so on. Database 170 may also be adapted to store processed information associated with the network topology and demands in the communication network 160, so as to facilitate efficient route configurations and resource allocations to satisfy the demands in the communication network 160. For example, database 170 may be adapted to store a preplan assignment (or components thereof). The data stored in database 170 may be transmitted to the network management system 150 and/or the nodes 120. In some embodiments, database 170 can be stored in a cloud-based server (not shown) accessible to the network management system 150 and/or the nodes 120 through the network 140. While the database 170 is illustrated as an external device connected to the network management system 150, the database 170 may also reside within the network management system 150 as an internal component of the network management system 150. In some embodiments, database 170 can be distributed among the nodes of communication network 160.

As shown in FIG. 1, nodes 120 can be connected with client devices 130 respectively to service demands. As an example, client devices 130 may include a display such as a television, tablet, computer monitor, video conferencing console, IoT device, or laptop computer screen. Client devices 130 may also include video/audio input devices such as a video camera, web camera, or the like. As another example, client devices 130 may include mobile devices (e.g., a wearable device, a tablet, a smartphone, a laptop, or other mobile device having display and video/audio capture capabilities). While FIG. 1 shows one client device 130 connected to each node, zero or more client devices 130 may be connected to a node.

In some embodiments, communication network 160 can include an optical network, where the nodes 120 are interconnected by optical fiber links. Such optical fiber links can include optical fiber links that support communication over multiple optical channels using multiple optical wavelengths. The optical network can be implemented, at least in part, using a wavelength division multiplexing (WDM) physical layer. A WDM optical signal can use a plurality of transmission channels, each channel carrying an information signal modulated over a carrier wavelength. A node can be configurable to switch a channel from an input fiber to an output fiber, or to add/drop traffic. A node can include a wavelength switch or an optical add/drop multiplexer that performs optical add, drop, and pass through. A node may include optical or optical/electrical elements configurable to perform functions including compensating, amplifying, switching, restoring, performing wavelength conversion of incoming optical signals, etc. The optical fiber links may include dispersion compensation fibers (DCF), optical filters, amplifiers, and other relevant optical components suitable for operation of optical networks. The network management system 150 or database 170 can store topologic data that includes information about optical channels and their associated wavelengths. The WDM physical layer can be configured to support flexible assignment of frequencies and wavelengths to signals. For example, a communication link can carry a first signal and a second signal. The first signal can have a first spectral width (also referred to herein as a frequency slot width) and a first central frequency, while the second signal has a second spectral width and a second central frequency. The first and second signals can be non-overlapping in the frequency spectrum. In some embodiments, the WDM physical layer can be or support an elastic optical network (e.g., a "Flexgrid" network or the like). For convenience of explanation, frequency slots are depicted as contiguous subsets of an array of unit frequency slot widths. The width of the frequency slot is the number of unit frequency slot widths in the contiguous subset. The central frequency of the frequency slot is the midpoint of the contiguous subset. Without departing from envisioned embodiments, the disclosed embodiments may be implemented using central frequencies and frequency slot widths demarcated in Hz (e.g., integer multiples of 6.25 GHz, 12.5 GHZ, or other base values; arbitrary spectrum bands defined by central frequencies and bandwidths, or other suitable schema).

Figure 2:
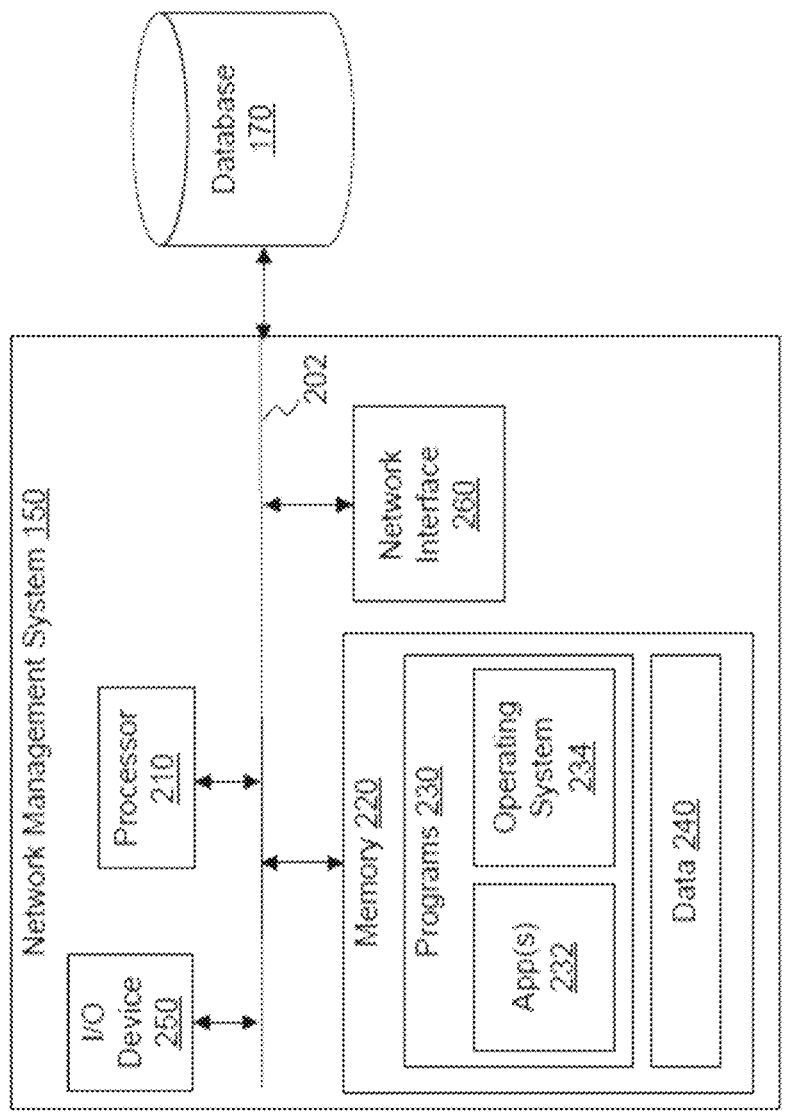
FIG. 2 depicts a diagram of an exemplary computing device suitable for implementing a network management system, consistent with disclosed embodiments.

FIG. 2 depicts a diagram of an exemplary computing device 201 (e.g., a mobile device, laptop, desktop, workstation, network appliance, or the like) suitable for implementing network management system 150, consistent with the disclosed embodiments. Network management system 150 can be implemented using one or more such computing devices 201 (e.g., a single computing device, a cluster of such computing devices, a virtual computing device running on such a computing device, a cloud-computing platform implemented using such devices, or another suitable implementation). Network management system 150 can be configured, by configuring the computing device(s) implementing network management system 150, to perform systems and methods for managing a communication network, consistent with disclosed embodiments. In such a manner, network management system 150 can be configured to determine paths for demands over a network graph. In some embodiments, network management system 150 can configure a communication network corresponding to the network graph to satisfy the demands using routes corresponding to the paths.

Consistent with disclosed embodiments, computing device 201 can also be suitable for implementing a node, such as one or more of nodes 120. The one or more of nodes 120 can be configured, by configuring the computing device(s) implementing the one or more of nodes 120, to perform systems and methods for configuring the communication network to satisfy one or more demands using routes corresponding to determined paths on a network graph corresponding to the communication network.

The computing device 201 can include a bus 202 (or other communication mechanism) which interconnects subsystems and components for transferring information within the computing device. As shown, the computing device 201 can include one or more processors 210, input/output ("I/O") devices 250, network interface 260 (e.g., a modem, Ethernet card, or any other interface configured to exchange data with a network), and one or more memories 220 storing programs 230 including, for example, server app(s) 232, operating system 234, and data 240, and can communicate with an external database 170 (which, for some embodiments, may be included within the computing device 201).

The processor 210 can be a central processing unit (CPU), graphical processing unit (GPU), application specific integrated circuit (ASIC) of system on a chip (SoC), field programmable gate array (FPGA), or the like. The processor 210 may comprise a single core or multiple core processors executing parallel processes simultaneously. For example, the processor 210 may be a single-core processor configured with virtual processing technologies. In certain embodiments, processor 210 may use logical processors to simultaneously execute and control multiple processes. The processor 210 may implement virtual machine technologies, or other technologies to provide the ability to execute, control, run, manipulate, store, etc. multiple software processes, applications, programs, etc. In some embodiments, the processor 210 may include a multiple-core processor arrangement (e.g., dual, quad core, etc.) configured to provide parallel processing functionalities to allow the computing device 201 to execute multiple processes simultaneously. It is appreciated that other types of processor arrangements could be implemented that provide for the capabilities disclosed herein.

The memory 220 may be a volatile or non-volatile, magnetic, semiconductor, tape, optical, removable, non-removable, or other type of storage device or tangible or non-transitory computer-readable medium that stores one or more program(s) 230 such as server apps 232 and operating system 234, and data 240. Possible forms of non-transitory media include, for example, a flash drive, a flexible disk, a hard disk, solid state drive, magnetic tape, or any other magnetic data storage medium, a CD-ROM, any other optical data storage medium, any physical medium with patterns of holes, a RAM, a PROM, and EPROM, a FLASH-EPROM, or any other flash memory, NVRAM, a cache, a register, any other memory chip or cartridge, and networked versions of the same.

Computing device 201 may include one or more storage devices configured to store information used by processor 210 (or other components) to perform certain functions related to the disclosed embodiments. For example, computing device 201 may include memory 220 that includes instructions to enable the processor 210 to execute one or more applications, such as server apps 232, operating system 234, and any other type of application or software known to be available on computer systems. Alternatively or additionally, the instructions, application programs, etc. may be stored in an external database 170 (which can also be internal to computing device 201) or external storage communicatively coupled with computing device 201 (not shown), such as one or more database or memory accessible over the network 140.

Database 170 or other external storage may be a volatile or non-volatile, magnetic, semiconductor, tape, optical, removable, non-removable, or other type of storage device or tangible or non-transitory computer-readable medium. Memory 220 and database 170 may include one or more memory devices that store data and instructions used to perform one or more features of the disclosed embodiments. The memory 220 and database 170 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases.

In some embodiments, computing device 201 may be communicatively connected to one or more remote memory devices (e.g., remote databases or the like) through network 140 or a different network. The remote memory devices can be configured to store information that the computing device 201 can access and/or manage. By way of example, the remote memory devices could be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Programs 230 may include one or more software modules configured to cause processor 210 to perform one or more functions of the disclosed embodiments. Moreover, processor 210 may execute one or more programs located remotely from one or more components of communication system 100. For example, computing device 201 may access one or more remote programs that, when executed, perform functions consistent with disclosed embodiments.

Consistent with disclosed embodiments, server app(s) 232 can cause processor 210 to perform functions consistent with disclosed embodiments. For example, server app(s) 232 can cause processor 210 to determine routes and allocate resources for services to be delivered in communication network 160.

In some embodiments, program(s) 230 may include operating system 234 performing operating system functions when executed by one or more processors such as processor 210. By way of example, operating system 234 may include Microsoft Windows™, Unix™, Linux™, Apple™ operating systems, Personal Digital Assistant (PDA) type operating systems, such as Apple iOS™, Google Android™, Blackberry OS™, or other types of operating systems. Accordingly, disclosed embodiments may operate and function with computer systems running any type of operating system 234. Computing device 201 may also include software that, when executed by processor 210, enables communication with network 140 through the network interface 260 and/or a direct connection to one or more nodes 120A-120E.

In some embodiments, data 240 may include, for example, network configurations, requirements of demands, routes for satisfying the demands (e.g., backup routes) and relationships between the routes (e.g., mappings between backup routes and communication link failures), capacities of the network devices, and so on. For example, data 240 may include network topology of the communication network 160 and operating status (e.g., operating properly or not operating properly) of the communication links between the nodes 120. The data 240 may also specify demand requirements and routes for each demand in the communication network 160.

Computing device 201 may also include one or more I/O devices 250 having one or more interfaces for receiving signals or input from devices and providing signals or output to one or more devices that allow data to be received and/or transmitted by network management system 150. For example, computing device 201 may include interface components for interfacing with one or more input devices (e.g., keyboard(s), mouse device(s), and the like) that enable computing device 201 to receive input from an operator or administrator (not shown).

Figure 3A:
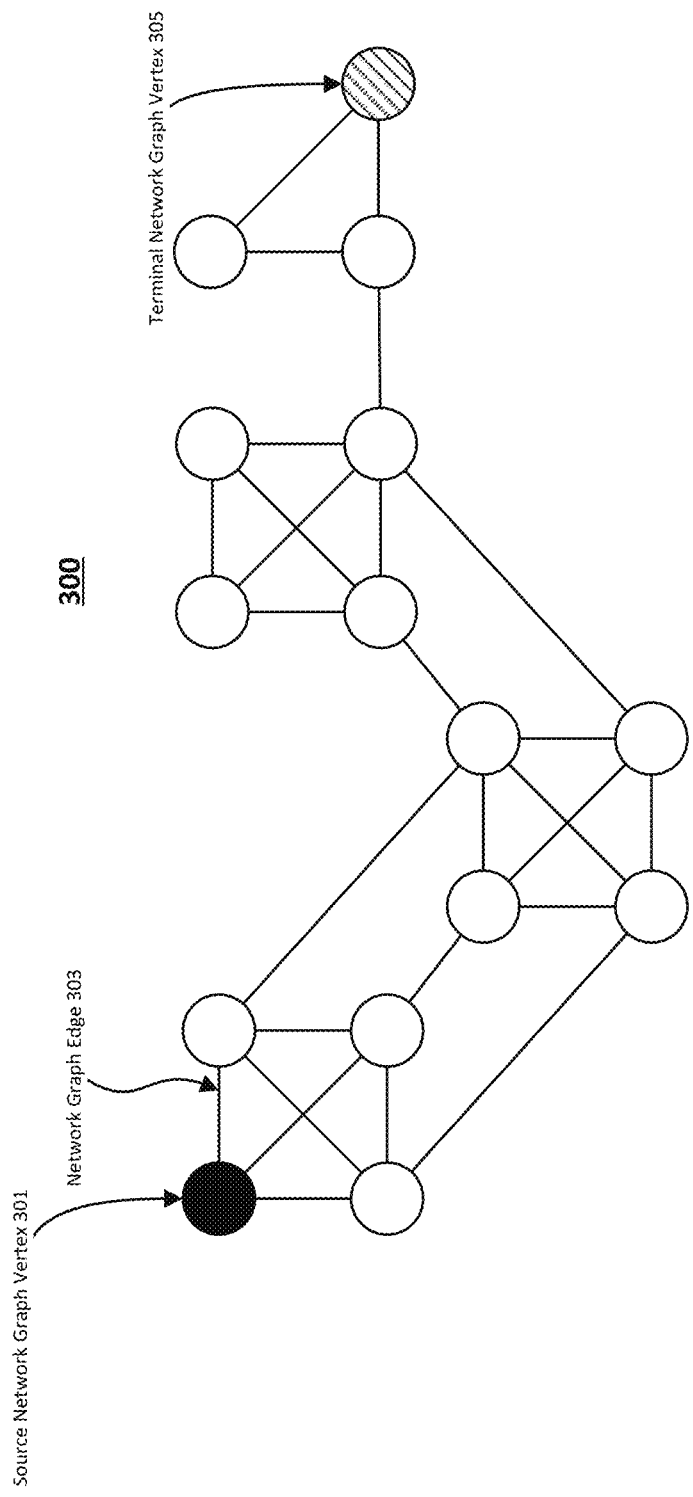
FIG. 3A depicts an exemplary network graph corresponding to an optical communication network that supports wavelength division multiplexing, consistent with disclosed embodiments.

FIG. 3A depicts an exemplary network graph 300 correspond to an optical communication network that supports wavelength division multiplexing, consistent with disclosed embodiments. Network graph 300 includes vertices (e.g., source network graph vertex 301, terminal network graph vertex 305) that correspond to nodes of the optical communication network and edges (e.g., network graph edge 303) that correspond to communication links in the optical communication network. In this example, a demand on the optical communications network originates at a source node corresponding to source network graph vertex 301 and terminates at a terminal node corresponding to terminal network graph vertex 305.

Figure 3B:
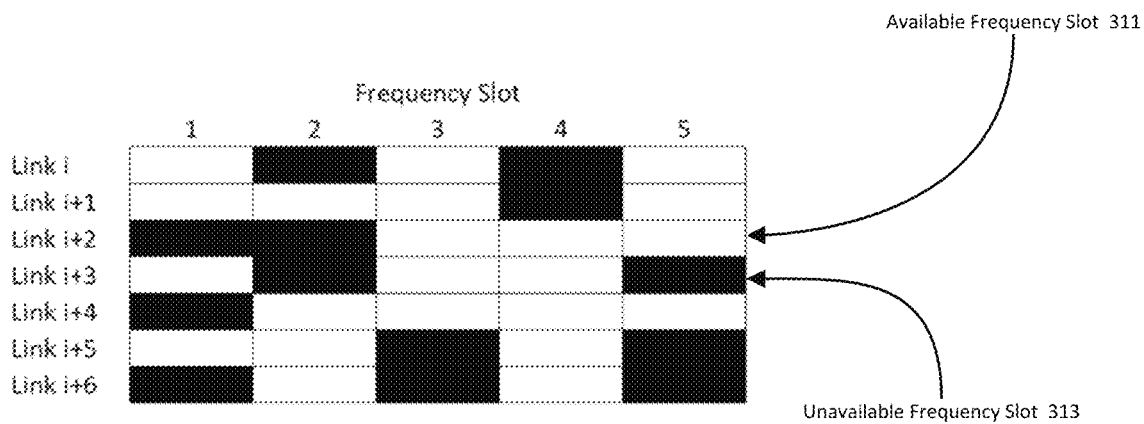
FIG. 3B depicts an exemplary assignment of routes to frequency slots for a subset of the communications links in the optical communications network corresponding to the exemplary network graph of FIG. 3A, consistent with disclosed embodiments.

FIG. 3B depicts an exemplary assignment of routes to frequency slots for a subset of the communications links in an optical communications network, consistent with disclosed embodiments. The frequency slots include available frequency slots (e.g., available frequency slot 311) and unavailable frequency slots (e.g., unavailable frequency slot 313). The available routes are depicted as having a frequency slot width of one, but routes may require frequency slot widths greater than one. Accordingly, an assignment of routes to frequency slots that disperses unavailable frequency slots throughout the frequency spectrum can be inefficient. For example, no route requiring a frequency slot width of two can be assigned to either link i or link i+6, as no contiguous frequency slots are available for these links.

Figure 3C:
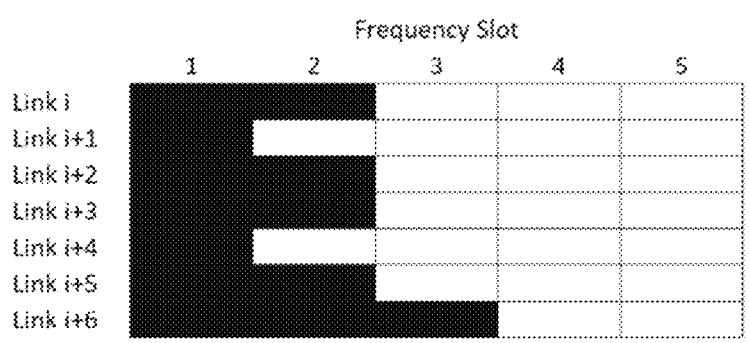
FIG. 3C depicts another assignment of routes to frequency slots for a subset of the communications links in the optical communications network corresponding to the exemplary network graph of FIG. 3A, consistent with disclosed embodiments.

FIG. 3C depicts another assignment of routes to frequency slots for the subset of the communications links in the optical communications network, consistent with disclosed embodiments. Accordingly to some envisioned costs functions, the assignment depicted in FIG. 3C is more efficient than the assignment depicted in FIG. 3B. While the assignments depicted in FIGS. 3B and 3C include the same number of available frequency slots; the assignment depicted in FIG. 3B includes more contiguous frequency slots. The assignment depicted in FIG. 3C can therefore accommodate more additional routes that require frequency slot widths of two (or three). For example, routes requiring a frequency slot width of two can now be assigned to contiguous frequency slots in either link i or link i+6.

FIGS. 4A to 4E depict exemplary layer graphs corresponding to the network graph of FIG. 3, consistent with disclosed embodiments. Each of these layer graphs corresponds to a different frequency slot in a set of frequency slots. As may be appreciated, the frequency slots in such a set can have different combinations of central frequency and frequency slot width.

Figure 4A:
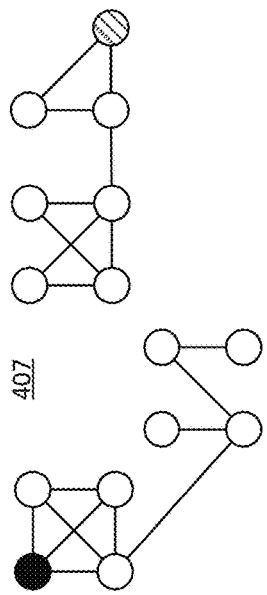
FIGS. 4A to 4E depict exemplary layer graphs corresponding to the network graph of FIG. 3, consistent with disclosed embodiments.
Figure 4D:
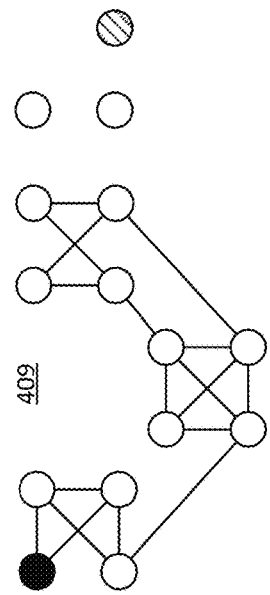
Figure 4B:
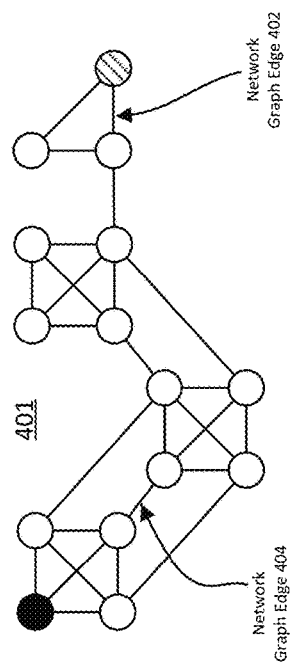
Figure 4E:
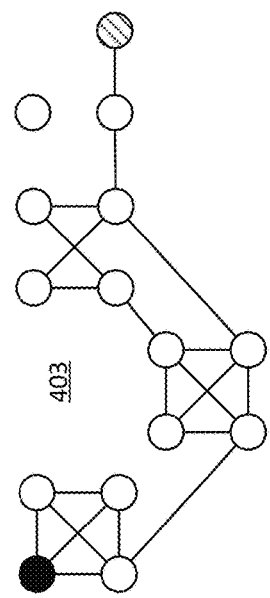
Figure 4C:
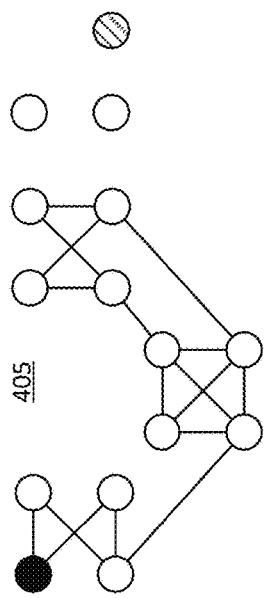

A layer graph corresponding to a frequency slot includes edges corresponding to communication links for which that frequency slot is available. For example, FIG. 4A depicts a layer graph 401 that includes network graph edges 402 and 404. The inclusion of these edges indicates that the frequency slot corresponding to layer graph 401 is available for the communication links corresponding to network graph edges 402 and 404. However, network graph edge 404 is absent from layer graphs 403, 405, 407, and 409. This absence indicates that the frequency slots corresponding to layer graphs 403, 405, 407, and 409 are unavailable for the communication link corresponding to network graph edge 404. Similarly, network graph edge 402 is absent from layer graphs 405 and 409. This absence indicates that the frequency slots corresponding to layer graphs 405 and 409 are unavailable for the communication link corresponding to network graph edge 404. The disclosed embodiments are not limited to any particular reason for the unavailability of a frequency slot at a communication link. In some instances, the frequency slot may already be assigned to another route or may conflict with a frequency slot already assigned to another route. For example, as discussed with regards to In some instances, the frequency slot may not satisfy a usage condition, such as signal-to-noise ratio, cost, membership in a logical or physical network partition, or the like. In some instances, the frequency slot may lack a corresponding transceiver between the nodes that constitute the endpoints of the communication link. For example, the nodes constituting the endpoints of the communication link corresponding to network graph edge 402 may include a first transceiver capable of supporting the frequency slots corresponding to layer graph 401 and layer graph 403, and a second transceiver capable of supporting the frequency slot corresponding to layer graph 407. However, these nodes may lack transceivers capable of supporting the frequency slots corresponding to layer graphs 405 and 409.

Figure 5:
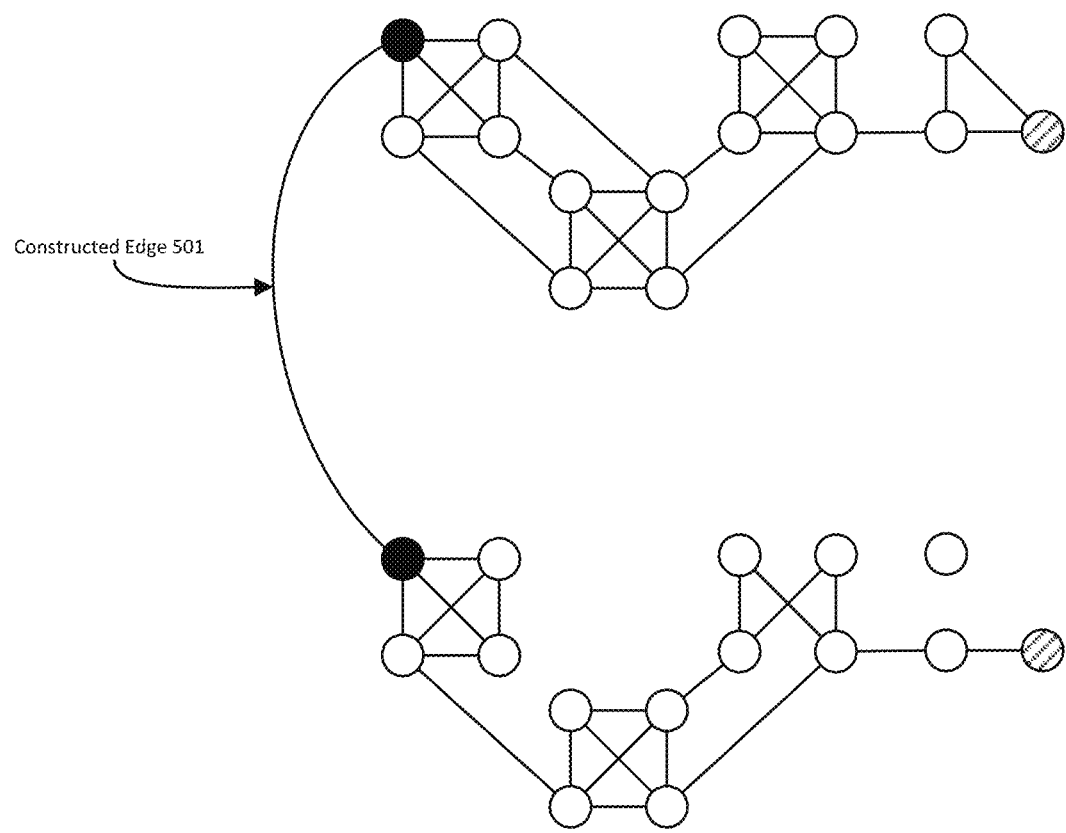
FIG. 5 depicts an exemplary combined layer graph, consistent with disclosed embodiments.

FIG. 5 depicts an exemplary combined layer graph 500, consistent with disclosed embodiments. The exemplary combined layer graph 500 includes both layer graph 401 and layer graph 403 from FIG. 4. A combined layer graph can be generated for a demand by connecting the source layer graph vertices corresponding to the demand or the terminal layer graph vertices corresponding to the demand (e.g., layer graphs 401 and 403 can be connected using constructed edge 501, as shown). As described herein, a path can then be determined from a source layer graph vertex to a terminal layer graph vertex. The constructed edge can ensure that both layer graphs are simultaneously search for a path. In some embodiments in which scores are associated with the layer graph edges, the score associated with the constructed edge can be selected such that this score does not affect the determination of the paths (e.g., the score can be zero, or otherwise substantially less than the scores associated with the layer graph edges).

Figure 6:
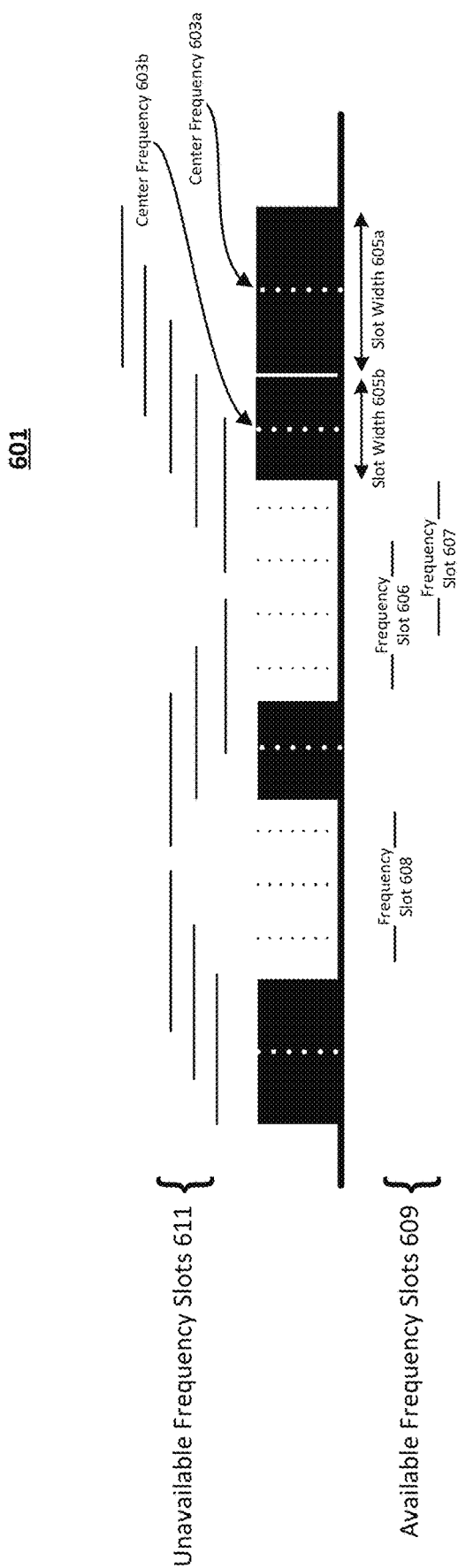
FIG. 6 depicts exemplary frequency slots on a frequency spectrum, consistent with disclosed embodiments.

FIG. 6 depicts an exemplary relationship between a set of central frequencies on frequency spectrum 601 and a set of potential frequency slots, consistent with disclosed embodiments. Frequency spectrum 601 can correspond to a communication link in a communication network. Previously assigned frequency slots for the communication link are represented by four black boxes, each having a center frequency (e.g., center frequency 603a and center frequency 603b) and a slot width (e.g., slot width 605a and slot width 605b). As may be observed, frequency slot widths can differ (e.g., slot width 605b is greater than slot width 605b). Available center frequencies are represented by dotted lines. The depicted set of potential frequency slots includes both available frequency slots 609 and unavailable frequency slots 611. These frequency slots are three frequency units wide. An offset between each frequency slot is one frequency unit. In some embodiments, separation between frequency slots can depend on the separation between center frequencies. Available frequency slots 609 include frequency slots 606, 607, and 608 that do not overlap a used portion of the spectrum, while unavailable frequency slots 611 include frequency slots that overlap a used portion of the frequency spectrum.

As may be observed from FIG. 6, the four previously assigned frequency slots may block most of the potential frequency slots in the set of potential frequency slots. In some embodiments, layer graphs may not include edges corresponding to unavailable frequency slots 611 for the communication link corresponding to frequency spectrum 601. Furthermore, of the three available frequency slots, frequency slot 608 completely fills the available spectrum space between two assigned frequency slots. In contrast, both frequency slot 606 and frequency slot 607 partially fill the available spectrum space between two assigned frequency slots. Furthermore, selecting frequency slot 606 would render frequency slot 607 unavailable. Likewise, selecting frequency slot 607 would render frequency slot 606 unavailable. In contrast, selecting frequency slot 608 does not affect any of the other available frequency slots.

As may be appreciated, other sets of potential frequency slots may include narrower frequency slots (e.g., frequency slots one unit wide) or wider frequency slots (e.g., frequency slots four units wide). Consistent with disclosed embodiments, the required bandwidth for a demand, the available types of transceivers, costs or signal-to-noise considerations, or the like may determine the set of potential frequency slots usable for a path.

Figure 7:
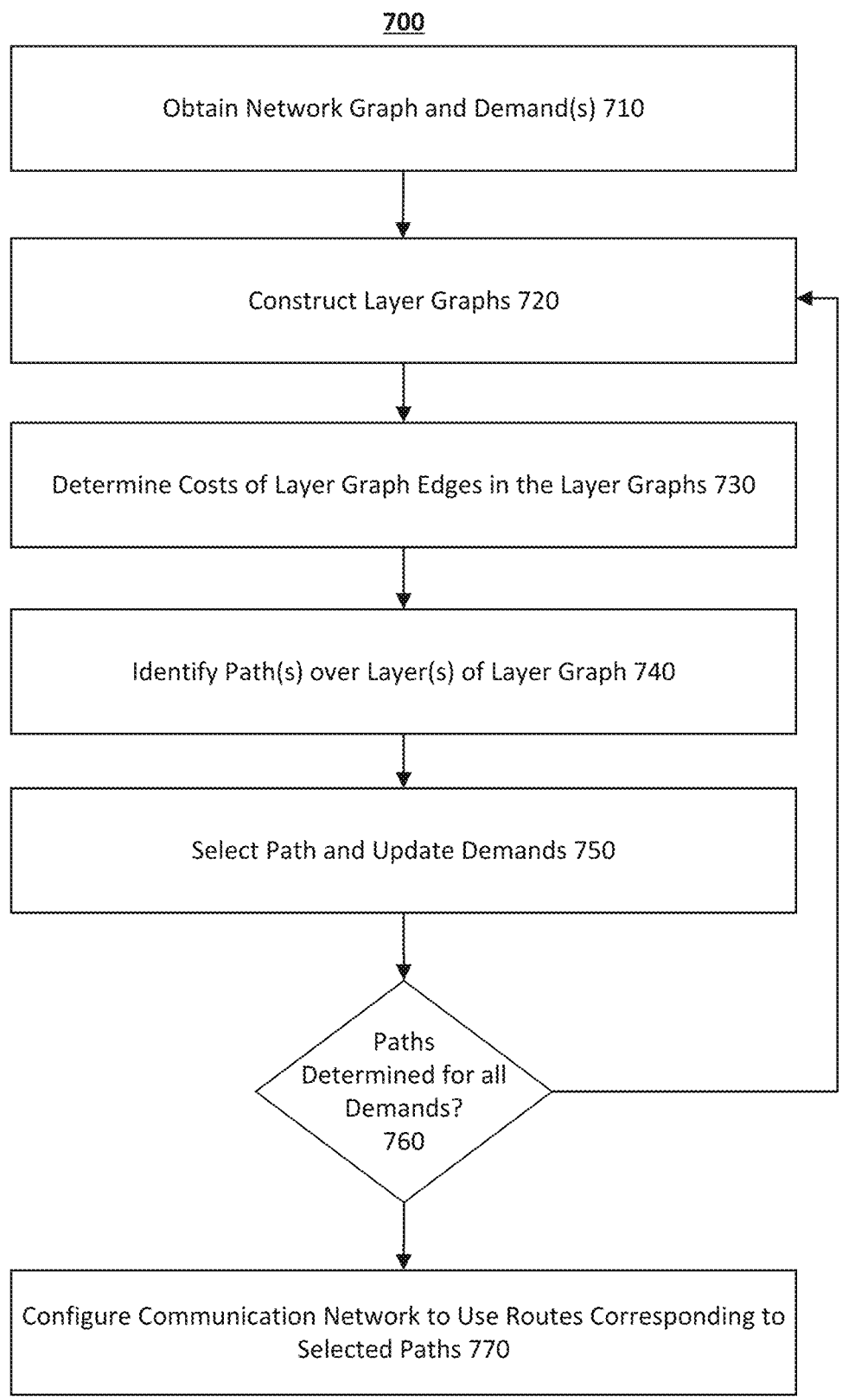
FIG. 7 depicts an exemplary process for configuring a communication network that supports wavelength division multiplexing, consistent with disclosed embodiments.

FIG. 7 depicts an exemplary process 700 for configuring a communication network (e.g., communication network 160, or the like) that supports wavelength division multiplexing, consistent with disclosed embodiments. For convenience of explanation, process 700 is described as being performed by a network management system of a communication system (e.g., management system 150 of communication system 100). However, the disclosed embodiments are not so limited. Consistent with disclosed embodiments, process 700 can be performed at least in part by another component of the communication system, or another system.

In step 710 of process 700, the network management system can obtain a network graph corresponding to a communication network, consistent with disclosed embodiments. In some embodiments, the network management system can receive or retrieve the network graph from another component of the communication system (e.g., database 170, or the like). In some embodiments, the network management system can receive or retrieve topologic data from one or more other components of the communication system (e.g., database 170, node(s) 120, or the like). For example, node(s) of the communication network can provide topologic data concerning communication links (or the status of such communication links) connected to the node(s) to the network management system. The network management system can then construct a network graph using the topologic data.

Consistent with disclosed embodiments, the network graph can include network edges corresponding to communication links in the communication network and network vertices corresponding to nodes in the communication network.

In some embodiments, the network management system can be preconfigured with a set of frequency slots for the communication network. For example, the network management system can be configured to implement (or optionally implement) a standard specifying the set of frequency slots.

In some embodiments, network management system can determine a set of frequency slots for the communication network. In some embodiments, the network management system can receive or retrieve the set of frequency slots (data describing the set of frequency slot) from other component(s) of the communication system (e.g., database 170, node(s) 120, or the like) or from another system. In some embodiments, the network management system can determine the set of frequency slots from the data received from the other component(s) of the communication system or from the other system. For example, the node(s) of the communication network can indicate the transceiver types (e.g., the transceiver models, capabilities, specifications, or the like) available at the node(s). The network management system can determine the set of frequency slots based on the transceiver types available at the nodes. For example, the network management system can determine the union of frequency slots available for each node, based on the transceiver types available at that node. The network management system can then determine the union of the frequency slots available for the nodes. The set of frequency types can then be the union of the frequency slots available for the nodes.

The disclosed embodiments are not limited to a particular manner of specifying the frequency slots. In various embodiments, the set of frequency slots can be specified in terms of a frequency spectrum and range of frequency slot widths, a set of center frequencies and a set of frequency slot widths, a set of center frequency/frequency slot width combinations, or the like.

In some embodiments, the frequency slots can be non-overlapping. For example, frequency slot $s_i$ can include the following frequency range:

$$s_i = [f_0 + (i - 1/2) \cdot f_c, f_0 + (i + 1/2) \cdot f_c]$$

where $f_0$ is some offset frequency, $f_0 + i \cdot f_c$ is the $i^{th}$ center frequency and $f_c$ is the gap between center frequencies and the slot width. In some embodiments, the frequency slots can be overlapping (e.g., as depicted in FIG. 6). Overlapping frequency slots can include frequency slots of differing frequency slot widths. For example, frequency slot $s_{ij}$ can include the following frequency range $$s_{ij} = [f_0 + (i - 0.5 \cdot j) \cdot f_c, f_0 + (i + 0.5 \cdot j) \cdot f_c]$$

In this example:

$$s_{11} = [f_0 + 0.5 \cdot f_c, f_0 + 1.5 \cdot f_c]$$
$$s_{21} = [f_0 + 1.5 \cdot f_c, f_0 + 2.5 \cdot f_c]$$
$$s_{12} = [f_0, f_0 + 2 \cdot f_c]$$
$$s_{22} = [f_0 + 2 \cdot f_c, f_0 + 3 \cdot f_c]$$

Here $s_{11}$ does not overlap with $s_{21}$, but does overlap with $s_{12}$ and $s_{22}$.

In step 710 of process 700, the network management system can further obtain set of demands on the communication network. Similar to the network graph, the set of demands (or demand information specifying the set of demands) can be received or retrieved from other component(s) of the communication system (e.g., database 170, node(s) 120, or the like) or another system. For example, the network management system can receive or retrieve the set of demands from a database of the communication system.

As an additional example, the network management system can receive or retrieve demand information from node(s) of the communication system. The demand information provide by a node can indicate demands managed by that node. The network management system can then create the set of demands using the demand information received or retrieved from the node(s).

Consistent with disclosed embodiments, network edges in the network graph can be associated with available subsets of the set of frequency slots for the communication network. As depicted in FIG. 6, for example, a set of frequency slots can include a subset of available frequency slots (e.g., available frequency slots 609) and a subset of unavailable frequency slots (e.g., unavailable frequency slots 611). The available subsets of frequency slots can different between network edges (e.g., due to different assignment of existing routes, difference transceiver type availability at different nodes, or the like).

Consistent with disclosed embodiments, a demand in the set of demands can have a source node and a terminal node of the communication network. A source network graph vertex on the network graph can correspond to the source node. A terminal network graph vertex on the network graph can correspond to the terminal node. In some embodiments, a demand can be associated with demand characteristics (e.g., bandwidth requirements, quality of service requirements, geography routing requirements, or the like).

In step 720, the network management system can construct layer graphs using the obtained network graph, consistent with disclosed embodiments. Each layer graph can correspond to one of the frequency slots and can include layer edges that correspond to network edges that include the corresponding frequency slot among the available frequency slots for that network edge. The layer graph can include layer graph vertices corresponding to zero of more of the network graph vertices. In some embodiments, the layer graph can include layer graph vertices corresponding to all of the network graph vertices. In some embodiments, the layer graph can include layer graph vertices corresponding to the network graph vertices connected by the network graph edges that include, in the frequency slot among the available frequency slots for that network edge.

The disclosed embodiments are not limited to any particular method of constructing the layer graph. In some embodiments, the network management system can construct layer graphs iteratively by traversing the set of frequency slots. The network management system can select a frequency slot in the set of frequency slots. The network management system can then identify the network graph edges in the network graph that include the selected frequency slot among the available frequency slots associated with that network graph edge. The network management system can then add corresponding layer graph edges to the layer graph. The network management system can then select another frequency slot in the set of frequency slots, until all the frequency slots in the set of frequency slots have been selected (and all layer graphs have been constructed). In some embodiments, the network management system can construct layer graphs simultaneously by traversing the set of network edges. The network management system can select a network edge in the set of network edges. The network management system can then include a corresponding layer graph edge in the layer graphs corresponding to the available frequency slots associated with the network edge. The network management system can then select another network graph edge in the network graph, until all the network graph edges have been selected (and all layer graphs have been constructed).

In step 730 of process 700, the network management system can determine costs of the layer graph edges in the layer graphs, consistent with disclosed embodiments. The cost for a layer graph edge can depend on the layer graph edges affected by selection of that layer graph edge. The network management system can identify layer graph edges affected by the inclusion of a layer graph edge in a path (e.g., affected layer graph edges). The network management system can then determine a layer edge cost based on the affected layer graph edges.

In some embodiments, the network management system can determine the affected layer graphs affected by the inclusion of the layer graph edge in a path (e.g., affected layer graphs). A layer graph can be affected by a layer graph edge when the frequency slot corresponding to the affected layer graph overlaps with the frequency slot corresponding to the layer graph containing the layer graph edge. A layer graph edge can be affected by another layer graph edge when it is contained in an affected layer graph and corresponds to the same network graph edge as the other layer graph.

For example, as depicted in FIG. 6, the communication link corresponding to frequency spectrum 601 can be associated with a set of frequency slots. A network edge in a network graph can correspond to the communication link. Layer graphs can be generated using the network graph. The layer graphs corresponding to frequency slots 606, 607, and 608 (e.g., layer graphs A, B, and C, respectively) can include layer graph edges corresponding to the network edge (e.g., layer graph edges A, B, and C, respectively). Inclusion of layer graph edge A affects only layer graph A. The only layer graph edge affected in layer graph A is layer graph A itself. In contrast, inclusion of layer graph edge B affects layer graph B and layer graph C. The layer graph edges affected are layer graph edge B itself and layer graph edge C. Because inclusion of layer graph edge B affects more layer graph edges than layer graph edge A, the network management system can assign layer graph edge B a high score than layer graph edge A.

In some embodiments, the network management system can then determine a cost for a layer graph edge by determining scores for the layer graph edges affected by the layer graph edge. In some embodiments, the scores for the layer graph edges can be equal. In such embodiments, the cost for a layer graph edge can depend on the number of layer graph edges affected by the layer graph edge.

In some embodiments, the score for a layer graph edge can depend on a topology of the network graph or of the layer graph containing the layer graph edge. For example, a cut set can include the layer graph edge (or corresponding network graph edge). The cut set can divide the network graph or layer graph into two subgraphs The importance of the layer graph edge in the layer graph (or the importance of the corresponding network graph edge in the network graph) can depend on the size of the cut set and the size of the two subgraphs. The smaller the number of layer graph edges (or network graph edges) in the cut set, the more important the layer graph edge (or network graph edge). The more evenly divided the two subgraphs, the more important the layer graph edge (or network graph edge). The more important the layer graph edge (or corresponding network graph edge), the greater the score assigned to the layer graph edge.

In some embodiments, the score for a layer graph edge can depend on the layer graph containing the layer graph edge. For example, the network management system can be configured to preferentially avoid frequency slots corresponding to certain transceiver types (e.g., based on transceiver capacity, cost, signal to noise ratio, or other characteristics). The network management system can therefore assign an offset value to layer graphs corresponding to frequency slots associated with the avoided transceiver types.

In some embodiments, the score for a layer graph edge can depend on the frequency slot corresponding to the layer graph containing the layer graph edge. For example, the network management system can be configured to preferentially fill lower-frequency frequency slots. The network management system can therefore assign higher scores to layer graph edges contained in layer graphs corresponding to higher-frequency frequency slots. The offset value can be constant or can increase with increasing central frequency of the frequency slots. Similarly, the network management system can assign higher scores to frequency slots with greater frequency slot width.

In various embodiments, a score can depend on multiple factors. For example, a layer graph containing a layer graph edge may correspond to a high-frequency frequency slot, but the layer graph edge may have low topological importance. The high-frequency frequency slot may tend to increase the score of the layer graph edge, while the low topological importance of the layer graph edge may tend to decrease the score of the layer graph edge. The particular form of a score function and the particular inputs to the score function may depend on, or be adapted to, a particular communication network.

In some embodiments, the network management system can determine a cost of a layer graph edge based on the scores of the affected layer graph edges. For example, the layer graph edge costs can be a function of the scores of the affected layer graph edges. In some embodiments, the layer graph edge cost can be the sum of the scores of the affected layer graph edges.

In step 740, the network management system can identify candidate path(s) over layer(s) of the layer graph(s), consistent with disclosed embodiments. In some embodiments, at least one candidate path can be determined for each of the demands obtained by the network management system.

Consistent with disclosed embodiments, the network management system can determine candidate paths for a demand for each layer graph (or determine that such a path does not exist). The network management system can select a layer graph and determine whether the layer graph includes both a source layer graph vertex and a terminal layer graph vertex for the demand. The source layer graph vertex can correspond to the source network graph vertex for the demand. The terminal layer graph vertex can correspond to the terminal network graph vertex for the demand. The network management system can then determine at least one paths from the source layer graph vertex to the terminal layer graph vertex.

Consistent with disclosed embodiments, such a path can depend on the layer graph edge costs of the layer graph edges in the layer graph. In generating the path, the network management system can favor inclusion of lower cost layer graph edges over higher cost layer graph edges. The network management system can therefore disfavor inclusion of layer graph edges that affect other layer graph edges (or that affect layer graph edges that are topologically important, contained in particular layer graphs or layer graphs corresponding to higher-frequency frequency slots, or other possess unsuitable characteristics).

In some embodiments, the network management system can determine candidate paths for a demand for multiple layer graphs at the same time. The network management system can construct layer graph edges connecting the layer graphs, as depicted in FIG. 5. In some embodiments, the constructed edges can connect the source layer graph vertices between two or more of the layer graphs (e.g., all the layer graphs). In some embodiments, the constructed edges can connect the terminal layer graph vertices between two or more of the layer graph (e.g., all the layer graphs). As described herein, the costs assigned to the constructed edges can be selected such that these costs do not affect the determination of paths with the combined layer graph. Thus the network graph can start at a source layer graph vertex in one layer graph and search the combined layer graph until a terminal layer vertex is reached. The terminal layer graph vertex may not be in the same layer graph as the source layer graph vertex, as the path can traverse a constructed edge connecting source layer graph vertices. In such instances, the source layer graph vertex closest to the terminal layer graph vertex can be deemed the source layer graph vertex. Similarly, the path can traverse a constructed edge connecting terminal layer graph vertices. In such instances, the terminal layer graph vertex closest to the source layer graph vertex can be deemed the terminal layer graph vertex.

The disclosed embodiments are not limited to a particular path-finding method. Consistent with disclosed embodiments, the network management system can use a suitable path-finding technique (e.g., Dijkstra's algorithm, depth-first search, breadth-first search, bidirectional search, min-cost flow, or other suitable technique) to find the path.

In step 750, the network management system can select the path having the lowest cost, consistent with disclosed embodiments. When the network management system determines candidate paths for each combination of layer graph and demand, the network management system can determine the lowest cost path over the various combinations of layer graph and demand.

Consistent with disclosed embodiments, the network management system can also update the set of demands. In some embodiments, the demand corresponding to the selected path can be removed from the set of demands (or otherwise removed from consideration).

In step 760, the network management system can determine whether paths have been selected for all of the demands on the communication network, consistent with disclosed embodiments. When paths have been selected for all demands, process 700 can advance to step 770. When there exists a demand that has not been assigned a path, process 700 can return to step 720.

Upon returning to step 720, the layer graphs can be updated to reflect the selection of the path in step 750. The layer graph edges affected by the layer graph edges in the selected path can be removed from the corresponding affected layer graphs.

Upon returning to step 730, the costs of the layer graph edges can be updated. In some embodiments, only the costs for layer graph edges in affected layers may be updated. In some embodiments, the costs in all layers may be updated.

Upon returning to step 740, the network management system can identify paths for the remaining demands using the updated layer graphs. In some embodiments, the network management system can determine whether updating the layer graphs renders existing candidate paths invalid. In such embodiments, the network management system may only determine updated or replacement candidate paths for invalid paths.

In some embodiments, process 700 may return to step 710. The available subsets of frequency slots can be updated to reflect the selection of certain combinations of frequency slot and network edge. Process 700 can then proceed to step 720 and reconstruct the layer graphs.

In step 770, the network management system can configure the communication network to use the route corresponding to the path having the lowest cost for the demand, consistent with disclosed embodiments. In some embodiments, the network management system can provide instructions to other components of the communication network (e.g., nodes 120, database 170, or the like). In some embodiments, the instructions can be received or retrieved by the node(s) of the communication network from the network management system or another component of the communication network (e.g., database 170, another node of the communication network). When processed by the components, the instructions can cause the components to (e.g., collectively) implement the selected paths for the demands.

Figure 8:
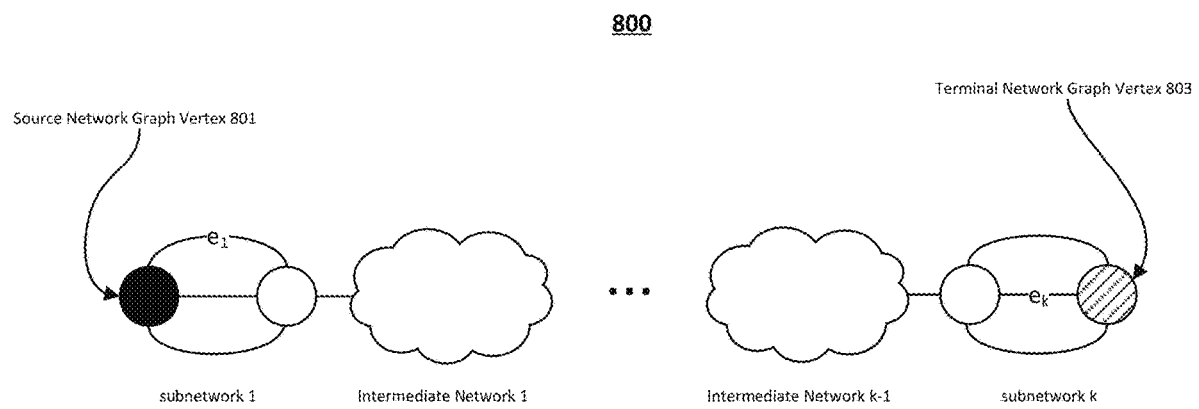
FIG. 8 depicts an exemplary network graph corresponding to an optical communication network with a particular architecture, consistent with disclosed embodiments.

FIG. 8 depicts an exemplary network graph 800 corresponding to a communication network with a particular architecture, consistent with disclosed embodiments. The determination of paths on this communication network can demonstrate the benefits provided by the disclosed embodiments. Network graph 800 can include network graph edges corresponding to communications links in the communication network and network graph vertices corresponding to nodes of the communication network. Network graph 800 can include k subnetworks. Each subnetwork can include two network graph vertices corresponding to nodes on the communication network. The two network graph vertices can be connected by three network graph edges.

In some embodiments, for each $2 \leq j < k$, one of the two of the graph vertices of subnetwork j is connected to subnetwork j−1 through an intermediate subnetwork j−1 and the other of the two of the graph vertices of subnetwork j is connected to subnetwork j+1 through an intermediate subnetwork j, the one of the two of the graph vertices of subnetwork 1 not connected through intermediate subnetwork 1 to subnetwork 2 is the source network graph vertex (e.g., source network graph vertex 801), and the one of the two of the graph vertices of subnetwork k not connected through intermediate subnetwork k−1 to subnetwork k−1 is the terminal network graph vertex (e.g., terminal network graph vertex 803).

In some embodiments, a set of frequency bands $\{c_1, c_2, \ldots, c_n\}$ is associated with the communication network and a set of overlapping frequency slots comprises consecutive pairs of these frequency bands.

In some embodiments, one of the three of the network graph edges $e_i$ in each subnetwork j has an available subset of the overlapping frequency slots that excludes the frequency slots $\{\{c_4, c_5\}, \{c_5, c_6\}, \{c_6, c_7\}, \{c_8, c_9\}, \{c_9, c_{10}\}, \{c_{10}, c_{11}\}\}$ and for each of the remaining network graph edges, an available subset of the overlapping frequency slots includes the entire set of overlapping frequency slots.

Consistent with disclosed embodiments, the network management system can obtain network graph 800. The network management system can obtain a demand on the communication network. The demand can be associated with a frequency slot width of two (e.g., based on a selected transceiver type for the demand). The source network graph vertex and terminal network graph vertex on network graph 800 can correspond to the demand.

A path for the demand can be determined using process 700, as described herein. Layer graphs can be determined, based on network graph 800. Costs can be determined for the layer graph edges. In this example, the scores for the layer graph edges can be equal. Candidate paths can be determined for the demand for each layer graph, or a combined layer graph can be constructed and searched for a lowest cost path. Consistent with disclosed embodiments, the lowest cost path can use the layer graph edges corresponding to frequency slot $\{c_7, c_8\}$. The lower costs path can include edges $e_1$ to $e_k$.

The disclosed embodiments may further be described using the following clauses:

1. A method for configuring an optical communication network, comprising: obtaining a network graph representing the optical communication network, the network graph including: network graph edges corresponding to communications links in the optical communication network, each of the network graph edges being associated with an available subset of a set of frequency slots for the optical communication network; and network graph vertices corresponding to nodes of the optical communication network; obtaining a demand on the optical communication network, the demand having a corresponding source network graph vertex and terminal network graph vertex on the network graph; constructing layer graphs using the network graph, each of the layer graphs corresponding to one of the frequency slots and including: layer edges corresponding to the network graph edges that include, in the available subsets for the network graph edges, the one of the frequency slots; layer vertices corresponding to the network graph vertices connected by the network graph edges that include, in the available subsets for the network graph edges, the one of the frequency slots; and wherein the layer vertices include a source layer vertex corresponding to the source network graph vertex and a terminal layer vertex corresponding to the terminal network graph vertex; selecting a path over a first layer of the layer graphs that connects the source layer vertex of the first layer to the terminal layer vertex of the first layer, the selection based on a cost associated with the selected path; and configuring the optical communication network to satisfy the demand using the selected path over the first layer.

2. The method of clause 1, wherein: the method further comprises: determining layer edge costs, the determination comprising: identifying affected layer graph edges for a first layer edge; and determining a first layer edge cost for the first layer edge based on the layer graph edges affected by the first layer edge; and determining the cost associated with the selected path using the layer edge costs.

3. The method of clause 2, wherein: determining the first layer edge cost compromises: determining the first layer edge cost based on scores for the layer graphs edges affected by the first layer edge.

4. The method of clause 3, wherein: the scores are equal; or the metric value for one of the layer graph edges depends on, at least in part, a topology of the network graph or of the layer graph including the one of the layer graph edges.

5. The method of clause 3, wherein: the metric value for one of the layer graph edges depends on, at least in part, the layer graph including the one of the layer graph edges; or the metric value for one of the layer graph edges depends on, at least in part, a central frequency or a frequency slot width associated with the layer graph including the one of the layer graph edges.

6. The method of any one of clauses 1 to 5, wherein: selecting the path over the first layer of the layer graphs comprises: constructing a combined layer graph by joining the source layer vertices or joining the terminal layer vertices; and searching the combined layer graph to identify at least one path from one of the source layer vertices to one of the terminal layer vertices.

7. The method of any one of clauses 1 to 6, wherein: the method includes selecting a transceiver type for the demand, the transceiver type specifying a frequency slot width; and the first layer is further selected based on the specified frequency slot width.

8. The method of any one of clauses 1 to 7, wherein: the set of frequency slots comprises overlapping frequency slots.

9. The method of any one of clauses 1 to 8, wherein: each frequency slot corresponds to a center frequency and a frequency slot width.

10. The method of any one of clauses 1 to 9, further comprising: updating the network graph or the layer graphs based on the selection of the path.

11. A method for configuring an optical communication network, comprising: obtaining layer graphs, each of the layer graphs corresponding to one of a set of frequency slots on the optical communication network and including: layer vertices corresponding to a subset of a set of network vertices, the network vertices corresponding to nodes of the optical communication network, the layer vertices including a source layer vertex and a terminal layer vertex, the source layer vertex corresponding to a source node of a demand on the optical communication network and the terminal layer vertex corresponding to a terminal node of the demand on the optical communication network; layer edges corresponding to a subset of network edges, the network edges corresponding to communication links in the optical communication network, each layer edge connecting two of the layer vertices; and wherein layer edge costs are associated with the layer edges, a first layer edge cost for a first layer edge based on the layer graphs or layer graph edges affected by the first layer edge; determining a path from the source layer vertex to the terminal layer vertex based on the layer edge costs; and configuring, based on the determined cost, the optical communication network to use the path to satisfy the demand.

12. The method of clause 11, wherein: obtaining the layer graphs comprises constructing the layer graphs using a network graph of the optical communication network.

13. The method of clause 12, wherein: the network graph includes: network graph edges corresponding to communications links in the optical communication network; network graph vertices corresponding to nodes of the optical communication network; and wherein each of the network graph edges is associated with an available subset of the set of frequency slots; a first layer graph of the layer graphs corresponds to a first frequency slot in the set of frequency slots; and constructing the layer graphs comprises, for the first layer graph: identifying edges in the network graph that include, in the available subsets, the first frequency slot; and identifying vertices in the network graph vertices connected by the network graph that include, in the available subsets, the first frequency slot.

14. The method of any one of clauses 11 to 13, wherein: obtaining the layer graphs comprises determining the layer edge costs, determining a first layer edge cost for a first layer edge comprising: identifying the layer graphs or layer graph edges affected by the first layer edge; and determining the first layer edge cost based on the identified layer graphs or layer graph edges.

15. The method of clause 14, wherein: determining the first layer edge cost comprises identifying the layer graph edges affected by the first layer edge; and the layer graph edges affected by the first layer edge are identified based on: a first frequency slot of a layer graph containing the first layer edge; and second frequency slots of the layer graphs containing the layer graph edges affected by the first layer edge.

16. The method of clause 15, wherein: the layer graph edges affected by the first layer edge are identified based on the first frequency slot overlapping with the second frequency slots.

17. The method of any one of clauses 14 to 16, wherein: determining the first layer edge cost for the first layer edge comprises determining the first layer edge cost based on the identified layer graph edges; and the first layer edge cost is determined based on scores of the identified layer graph edges.

18. The method of clause 17, wherein: the scores are equal; or the metric value for one of the identified layer graph edges depends on, at least in part, a topology of the network graph or of the layer graph including the one of the identified layer graph edges.

19. The method of clause 17, wherein: the metric value for one of the identified layer graph edges depends on, at least in part, the layer graph including the one of the identified layer graph edges; or the metric value for one of the identified layer graph edges depends on, at least in part, a central frequency or a frequency slot width associated with the layer graph including the one of the identified layer graph edges.

20. A method for configuring an optical communication network comprising: obtaining a network graph representing the optical communication network, the network graph including: network graph edges corresponding to communications links in the optical communication network; network graph vertices corresponding to nodes of the optical communication network; wherein a demand on the optical communication network has a corresponding source network graph vertex and terminal network graph vertex on the network graph, and is associated with a frequency slot width of two; and wherein: the network graph comprises k subnetworks, each subnetwork comprising two of the graph vertices, the two of the graph vertices connected by three of the network graph edges; for each $2 \leq j < k$, one of the two of the graph vertices of subnetwork j is connected to subnetwork j−1 through an intermediate subnetwork j−1 and the other of the two of the graph vertices of subnetwork j is connected to subnetwork j+1 through an intermediate subnetwork j, the one of the two of the graph vertices of subnetwork 1 not connected through intermediate subnetwork 1 to subnetwork 2 is the source network graph vertex, and the one of the two of the graph vertices of subnetwork k not connected through intermediate subnetwork k−1 to subnetwork k−1 is the terminal network graph vertex; a set of frequency bands $\{c_1, c_2, \ldots, c_n\}$ is associated with the optical communication network and a set of overlapping frequency slots comprises consecutive pairs of these frequency bands; and one of the three of the network graph edges $e_j$ in each subnetwork j has an available subset of the overlapping frequency slots that excludes the frequency slots $\{\{c_4, c_5\}, \{c_5, c_6\}, \{c_6, c_7\}, \{c_8, c_9\}, \{c_9, c_{10}\}, \{c_{10}c_{11}\}\}$ and for each of the remaining network graph edges, an available subset of the overlapping frequency slots includes the entire set of overlapping frequency slots; and determining a frequency slot and a path through the network graph, the frequency slot being $\{c_7, c_8\}$ and the path includes edges $e_1$ to $e_k$.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

What is claimed is:

1. A method for configuring an optical communication network, comprising:
    obtaining layer graphs corresponding to frequency slots for the optical communication network, the layer graphs including layer edges and layer vertices;
    determining layer edge costs for the layer edges, the determination of a first layer edge cost for a first layer edge of the layer edges including determining a set of unused layer edges affected by the first layer edge;
    determining, using the layer edge costs, a path that connects a first one of the layer vertices to a second one of the layer vertices; and
    configuring the optical communication network to satisfy a demand on the optical communication network using the determined path.

2. The method of claim 1, wherein further comprising: determining a set of affected layer graphs that include the set of unused layer edges.

3. The method of claim 2, wherein:
    the first layer edge cost depends on scores associated with the affected layer graphs in the determined set of affected layer graphs, the scores dependent at least in part on characteristics of the frequency slots corresponding to the affected layer graphs.

4. The method of claim 3, wherein:
    the characteristics of the frequency slots include at least one of frequency slot center frequency, frequency slot width, or transceiver type associated with the frequency slot.

5. The method of claim 1, wherein:
    the determination of the first layer edge cost for the first layer edge includes determining the set of unused layer edges affected by the first layer edge; and
    an unused layer edge is affected by the first layer edge when:
        the unused layer edge is contained in a layer graph affected by the first layer edge; and
        a communication link in the optical communication network corresponds to both the unused layer edge and the first layer edge.

6. The method of claim 5, wherein:
    the first layer edge cost depends on scores for the unused layer edges affected by the first layer edge.

7. The method of claim 6, wherein:
    the scores for the affected unused layer edges depending on, at least in part:
        a topology of a network graph representing the communication network, or
        topologies of the layer graphs including the respective affected unused layer edges.

8. The method of claim 1, wherein:
    at least two of the frequency slots overlap.

9. The method of claim 1, wherein:
    each frequency slot corresponds to a center frequency and a frequency slot width.

10. The method of claim 1, further comprising:
    updating the layer graphs based on the determination of the path.

11. A non-transitory, computer-readable medium containing instructions that, when executed by at least one processor of a system, cause the system to perform operations for configuring an optical communication network, comprising:
    obtaining layer graphs corresponding to frequency slots for the optical communication network, the layer graphs including layer edges and layer vertices;
    determining layer edge costs for the layer edges, the determination of a first layer edge cost for a first layer edge of the layer edges including determining a set of unused layer edges affected by the first layer edge;
    determining, using the layer edge costs, a path that connects a first one of the layer vertices to a second one of the layer vertices; and
    configuring the optical communication network to satisfy a demand on the optical communication network using the determined path.

12. The non-transitory, computer-readable medium of claim 11, wherein the operations further comprise:
    determining a set of affected layer graphs that include the set of unused layer edges.

13. The non-transitory, computer-readable medium of claim 12, wherein:
    the first layer edge cost depends on scores associated with the affected layer graphs in the determined set of affected layer graphs, the scores dependent at least in part on characteristics of the frequency slots corresponding to the affected layer graphs, the characteristics of the frequency slots including at least one of frequency slot center frequency, frequency slot width, or transceiver type associated with the frequency slot.

14. The non-transitory, computer-readable medium of claim 11, wherein:
    the determination of the first layer edge cost for the first layer edge includes determining the set of unused layer edges affected by the first layer edge; and
    an unused layer edge is affected by the first layer edge when:
        the unused layer edge is contained in a layer graph affected by the first layer edge; and
        a communication link in the optical communication network corresponds to both the unused layer edge and the first layer edge.

15. The non-transitory, computer-readable medium of claim 14, wherein:
    the first layer edge cost depends on scores for the unused layer edges affected by the first layer edge, the scores for the affected unused layer edges depending on, at least in part:
        a topology of a network graph representing the communication network, or
        topologies of the layer graphs including the respective affected unused layer edges.

16. A system, comprising:
    at least one processor; and
    at least one non-transitory, computer-readable medium containing instructions that, when executed by the at least one processor, cause the system to perform operations for configuring an optical communication network, comprising:
        obtaining layer graphs corresponding to frequency slots for the optical communication network, the layer graphs including layer edges and layer vertices;
        determining layer edge costs for the layer edges, the determination of a first layer edge cost for a first layer edge of the layer edges including determining a set of unused layer edges affected by the first layer edge;

determining, using the layer edge costs, a path that connects a first one of the layer vertices to a second one of the layer vertices; and configuring the optical communication network to satisfy a demand on the optical communication network using the determined path.

17. The system of claim 16, wherein the operations further comprise:

determining a set of affected layer graphs that include the set of unused layer edges.

18. The system of claim 17, wherein:

the first layer edge cost depends on scores associated with the affected layer graphs in the determined set of affected layer graphs, the scores dependent at least in part on characteristics of the frequency slots corresponding to the affected layer graphs, the characteristics of the frequency slots including at least one of frequency slot center frequency, frequency slot width, or transceiver type associated with the frequency slot.

19. The system of claim 16, wherein:

the determination of the first layer edge cost for the first layer edge includes determining the set of unused layer edges affected by the first layer edge; and an unused layer edge is affected by the first layer edge when:

the unused layer edge is contained in a layer graph affected by the first layer edge; and a communication link in the optical communication network corresponds to both the unused layer edge and the first layer edge.

20. The system of claim 19, wherein:

the first layer edge cost depends on scores for the unused layer edges affected by the first layer edge, the scores for the affected unused layer edges depending on, at least in part:

a topology of a network graph representing the communication network, or topologies of the layer graphs including the respective affected unused layer edges.

* * * * *